Figure 1:
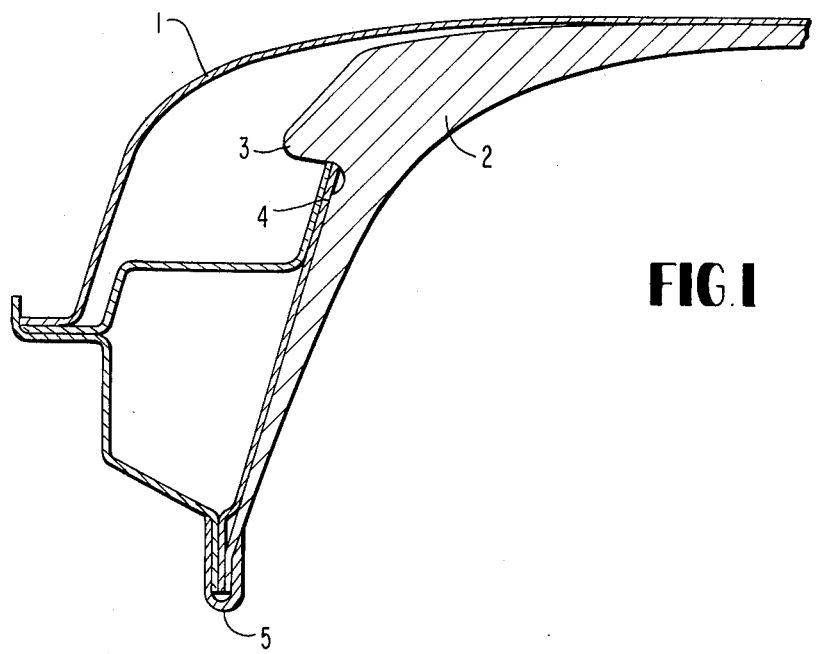

United States Patent [19]

Alfter et al.

[11] 4,043,589
[45] Aug. 23, 1977

[54] AUTOMOTIVE VEHICLE-DOME

[75] Inventors: Franz-Werner Alfter, Siegburg; Hans-Ulrich Breitscheidel; Heinz-Gerd Reinkemeyer, both of Troisdorf, all of Germany

[73] Assignee: Dynamit Nobel Aktiengesellschaft, Germany

[21] Appl. No.: 459,181

[22] Filed: Apr. 8, 1974

[30] Foreign Application Priority Data

Apr. 7, 1973  Germany .............................. 2317546

[51] Int. Cl.² .............................................. B60J 7/10
[52] U.S. Cl. ................................................ 296/137 A
[58] Field of Search .............. 296/137 A, 137 R, 1 R; 264/252; 52/403, 484, 485

[56] References Cited

U.S. PATENT DOCUMENTS

| 3,083,048 | 3/1963 | Kramer | 296/137 R |
| 3,642,317 | 2/1972 | Swindlehurst | 296/137 A |
| 3,697,126 | 10/1972 | Tiffin et al. | 296/137 A |
| 3,760,544 | 9/1973 | Hawes et al. | 52/403 |

FOREIGN PATENT DOCUMENTS

| 1,477,491 | 4/1967 | France | 296/137 A |
| 1,123,796 | 8/1968 | United Kingdom | 296/137 A |

*Primary Examiner*—Robert J. Spar
*Assistant Examiner*—Winston H. Douglas
*Attorney, Agent, or Firm*—Craig & Antonelli

[57] ABSTRACT

A self-supporting interior lining or vehicle dome having in the edge zones thereof at least one clamping or mounting bead adapted to cooperate with at least one undercut provided in the vehicle roof structure to mount the same thereon. At least one of the clamping bead and vehicle dome or a portion thereof is manufactured of an elastic material to facilitate installation within the vehicle.

13 Claims, 2 Drawing Figures

U.S. Patent  Aug. 23, 1977  4,043,589

AUTOMOTIVE VEHICLE-DOME

The present invention relates to an interior lining, especially for motor vehicles, constructed to be self-supporting and useable as a vehicle dome, which includes, for example, a multi-layer element made up of panels of a foamed material, such as polyethylene foam panels, connected with reinforcing inserts.

In automotive vehicles, containers, or the like, an interior lining is required which is composed of an insulating, lightweight material and which can be installed in a minimum amount of time. Additionally, with respect to interior roof linings of vehicles or so-called vehicle domes, there is a need for an interior lining or installation component which is also simultaneously dimensionally rigid and self-supporting.

One type of conventional interior lining or vehicle dome, for example, consists of a lining of soft polyurethane foam, artificial leather, or quilted or stitched nonwoven materials, which serves merely as the sole covering or layer on the vehicle roof and is not self-supporting.

In another type of conventional interior linings, the lining is, for example, made of pressed fibrous or nonwoven material impregnated with phenolic resin thereby resulting in a self-supporting vehicle dome. However, the use of such self-supporting vehicle dome is substantially determined and limited by the type of mounting employed in disposing the same in the vehicle. In this connection, one differentiates the conventional self-supporting vehicle domes by the various manners of attaching such domes in the vehicle.

Of the latter type of interior linings, the most popular vehicle dome is the so-called frame-supported or hoop dome wherein the dome is attached by means of frame members or hoops adapted to be mounted at prepunched bores provided in the vehicle body normally above the window frames and the door frames thereof. The additional mounting of the dome to the window and door frames is effected, in most cases, by gluing and/or by placing additional brackets or holding profile elements thereon. However, other conventional mounting means may be employed which, for example, include screws, clamps, buttons, snap connections, separate mounting profiles, or other suitable adhesive means.

The disadvantages or shortcomings of the conventional self-supporting vehicle domes reside in the requiring of additional fastening parts or materials as well as additional working steps and the preparation in connection with mounting the dome in the vehicle body.

The aim underlying the present invention essentially resides in improving the interior lining or car dome structure of the self-supporting type and in simplifying the incorporation of the self-supporting automobile dome into the vehicle body.

According to the present invention, an interior lining useable as a vehicle dome is characterized in that at least one outwardly extending clamping or mounting bead is molded or otherwise integrally formed to the vehicle dome in the zone of the offset edge thereof so that the dome can be attached by snapping the clamping or mounting bead into undercuts provided at the vehicle body thereby permitting the mounting without additional material or parts.

According to one embodiment of the present invention, the interior lining or vehicle dome mounting is fashioned as a clamp-type mounting wherein the clamping or mounting beads and/or a portion of the entire dome exhibits a certain amount of elasticity so that they are elastically deformable. By this arrangement, it is unnecessary to make additional preparations and/or modifications at the vehicle body since the customarily provided construction of the vehicle body is favorable for this type of mounting.

In a further embodiment of the present invention, the vehicle dome is provided at the edge zones thereof with several superimposed elastically deformable clamping or mounting beads which engage not only in one but in various undercuts provided in the vehicle body.

According to one feature of the present invention, the clamping or mounting bead or beads may extend over the entire length and width of the dome or the bead or beads can be interrupted or provided only in sections of the dome.

Accordingly, it is an object of the present invention to provide an interior lining or vehicle dome which avoids the aforementioned short-comings and drawbacks encountered in the prior art.

Another object of the present invention resides in an improved self-supporting interior lining or vehicle dome which, due to the configuration of the dome edges, can be mounted in a vehicle without additional parts or materials with the roof structure of the vehicle being utilized for the mounting.

Still another object of the present invention resides in providing an interior lining or vehicle dome which can readily be installed and removed without any difficulties.

Figure 2:
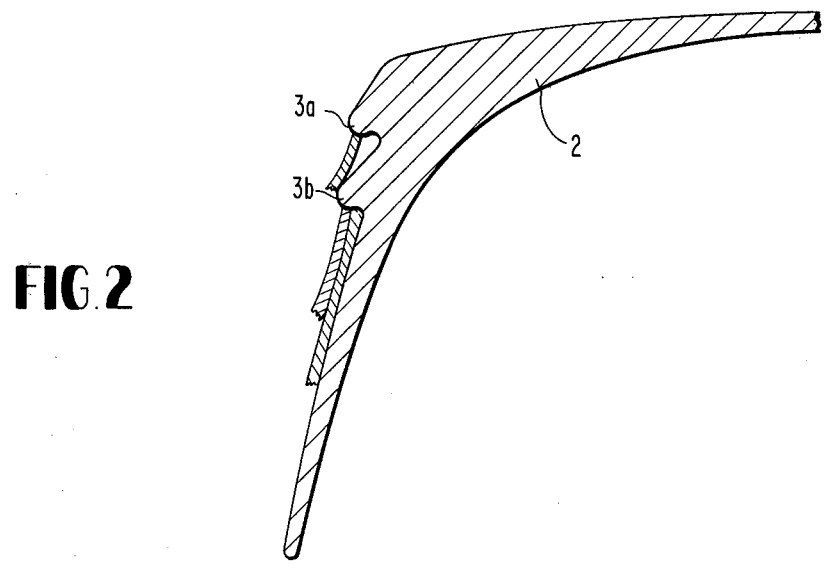

These and other objects, features, and advantages of the present invention will become more obvious from the following description when taken in connection with the accompanying drawing which shows, for the purpose of illustration only, several embodiments of the interior lining in accordance with the present invention, and wherein:

FIG. 1 is a partial cross-sectional view of the dome according to a first embodiment of the present invention attached to a vehicle body; and FIG. 2 is a partial cross-sectional view of the edge of a dome constructed in accordance with a second embodiment of the present invention.

Referring now to the drawing wherein like reference numerals are used in the two views to designate like parts, and more particularly to FIG. 1 which shows a partial view of the vehicle body roof 1 composed of several steel profile members. The vehicle dome 2 is provided with a molded or integrally formed clamping or mounting bead 3 in the edge zone thereof which is snapped into an undercut formed between the steel profile member 4 and the roof 1 of the vehicle body. The dome 2 is manufactured preferably of an elastic material or of a material which is elastic at least in the marginal zones thereof, such as, for example, a foam material so that the dome can be mounted by means of the bead 3 which is elastically deformed upon installation.

At the lower end of the dome 2, an optically smooth and attractive termination is achieved by a frame profile 5; however, the termination may also be effected by means of window and door apertures (not shown).

An especially suitable material for the car dome 2 constructed in accordance with the present invention is a solidly molded element fashioned to be self-supporting and comprising a polyethylene foam panel for example, a panel such as disclosed in commonly assigned U.S. patent application Ser. No. 422,725. The foam panel preferably consists of a cross-linked polyetheline foam and the foam panel may have identical or varying thickness with reinforcing layers or inserts laminated to one or both sides of the panel. Additionally, the reinforcing inserts or layers can be formed as grid-like or perforated parts or of parts consisting of flat positioned, upright-positioned, or deformed webs or ridges. Furthermore, the reinforcing layers may consist of a honeycomb-shaped panel. However, it is also possible according to the present invention to produce the reinforcing layers or inserts of thermoplastic synthetic resins.

As shown in FIG. 2, the offset edge of the vehicle dome 2 is provided with molded or integrally formed outwardly projecting, superimposed clamping or mounting beads 3a, 3b.

It is to be understood the size and configuration of the bead or beads as well as the arrangement or positioning of the clamping or mounting beads are dependent upon the specific undercuts which in turn are determined by the shape of a given vehicle body with these undercuts having varying shape depending on the respective type or model of the vehicle.

Additionally, a determining factor with regard to providing the clamping or mounting bead or beads over the entire length and width of the lining or interrupting or providing bead or beads only in sections is the specific type and model of vehicle which in turn determines the presence or absence of body undercuts along either the entire vehicle body roof or merely portions thereof. However, with the use of the configuration of the marginal or edge portion of the vehicle dome in accordance with the present invention, it is possible to install in a simple manner and without additional auxiliary means a self-supporting dome or interior lining in a vehicle.

While we have shown and described several embodiments in accordance with the present invention, it is understood that the same is not limited thereto but is susceptible to numerous changes and modifications as known to a person skilled in the art and we therefore do not wish to be limited to the details shown and described herein but intend to cover all such changes and modifications as are encompassed by the scope of the appended claims.

What we claim is:

1. An interior lining arrangement for vehicles having a roof structure, the arrangement comprising: means for mounting the interior lining in the vehicle including at least one mounting member secured to the roof structure, said mounting member terminating in a free end spaced from an inner surface of the roof structure to form between said free end and the roof structure at least one undercut portion disposed along at least a portion of at least one edge of the roof structure, a self-supporting lining means consisting of at least one panel of a cross-linked polyethelene foam, said lining means including at least one offset edge, and at least one outwardly extending elastically deformable clamping bead integrally formed along at least a portion of said at least one offset edge, said clamping bead including a lower surface overlying and extending beyond said free end of said mounting member, said lower surface of said at least one clamping bead engaging said free end of said at least one mounting member to clamp said self-supporting lining means in the vehicle in close proximity to the roof structure.

2. An arrangement according to claim 1, wherein said at least one mounting member portion extends along the entire length of said at least one edge of the roof structure.

3. An arrangement according to claim 2, wherein said outwardly extending elastically deformable clamping bead is provided along the entire length of said at least one offset edge and engages said free end of said at least one mounting member along the entire length thereof.

4. An arrangement according to claim 2, wherein said at least one mounting member is provided with interruptions, and wherein said outwardly extending elastically deformable clamping bead is provided with interruptions along said offset edge of said lining at locations thereon corresponding to the interruptions in said mounting member.

5. An arrangement according to claim 2, wherein said self-supporting lining includes an upper surface, said offset edge extending from an edge of said upper surface and terminating in a free end, said at least one elastically deformable outwardly extending clamping bead being arranged on said offset edge between said free end of said offset edge and the upper surface of said self-supporting lining.

6. An arrangement according to claim 1, wherein said free end of said mounting member forms with the roof structure at least one undercut portion disposed along at least a portion of a transversely extending edge of the roof structure and at least one undercut portion disposed along at least a portion of a longitudinally extending edge of the roof structure, and wherein said self-supporting lining means includes an offset edge extending substantially parallel to said undercut portion disposed along at least a portion of the longitudinally extending edge of the roof structure and an offset edge extending substantially parallel to said undercut portion disposed along at least a portion of the transversely extending edge of the roof structure, each of said offset edges being provided with at least one integrally formed elastically deformable outwardly extending clamping bead, each of said clamping beads including a lower surface overlying and extending beyond said free end of said mounting member, said lower surface portion of said clamping bead engaging said free end of said mounting member for clamping said self-supporting lining means in the vehicle along the transversely extending edge of the roof structure and the longitudinally extending edge of the roof structure.

7. An arrangement according to claim 1, wherein said at least one mounting member terminates in two free ends spaced from each other and from an inner surface of the roof structure to form between said free ends and the roof structure two undercuts disposed along at least a portion of at least one edge of the roof structure, at least two elastically deformable outwardly extending clamping beads are integrally formed along at least a portion of said offset edge of said lining, each of said clamping beads including a lower surface, the lower surface of one of said clamping beads overlies and extends beyond one of said free ends of the mounting member and the lower surface of the other of said clamping beads overlies and extends beyond the other of the free ends of said mounting member, the lower surfaces of said clamping beads engaging the respective free ends of said mounting member to clamp said self-supporting lining in the vehicle in close proximity to the roof structure.

8. An arrangement according to claim 7, wherein said outwardly extending beads are disposed in superimposed relationship along said at least one offset edge portion.

9. An arrangement according to claim 7, wherein said self-supporting lining includes an upper surface, said offset edge extending from an edge of said upper surface and terminating in a free end, said at least two elastically deformable outwardly extending clamping beads being arranged on said offset edge between said free end of said offset edge and the upper surface of said self-supporting lining.

10. An arrangement according to claim 1, wherein at least a portion of said self-supporting lining means are elastically deformable.

11. An arrangement according to claim 1, wherein said free end of said mounting member forms with the roof structure at least two undercut portions disposed along at least a portion of a transversely extending edge of the roof structure and along at least a portion of a longitudinally extending edge of the roof structure, and wherein said self-supporting lining includes an offset edge extending substantially parallel to said last-mentioned undercut portions, each of said offset edges being provided with an outwardly extending elastically deformable clamping bead engageable with the free end of said mounting member for clamping said self-supporting lining means in the vehicle.

12. An arrangement according to claim 1, wherein said outwardly extending elastically deformable clamping bead is provided along the entire length of said at least one offset edge and engage said free end of said at least one mounting members along the entire length thereof.

13. An arrangement according to claim 1, wherein said lining means includes an upper surface spaced from an inner surface of the roof structure, said offset edge extending from an edge of said upper surface and terminating in a free end, said at least one outwardly extending elastically deformable clamping bead is arranged on said offset edge between said free end of said offset edge and the upper surface of said lining means.

* * * * *